Dec. 30, 1969     C. F. MESKAN     3,487,437
SNOWMOBILE WITH STABILIZING MEANS
Filed June 17, 1968
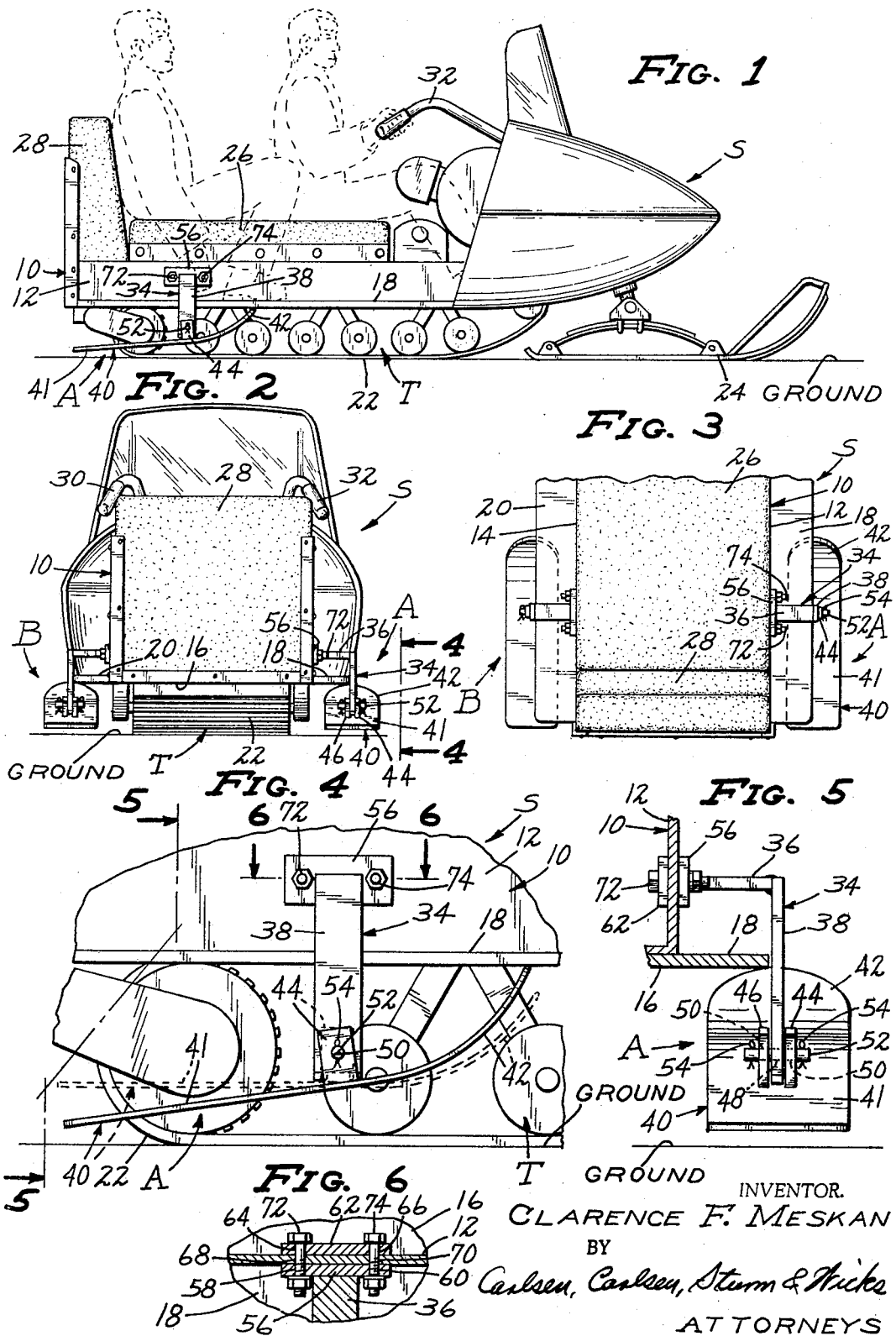
INVENTOR.
CLARENCE F. MESKAN
BY
Carlsen, Carlsen, Sturm & Wickes
ATTORNEYS United States Patent Office 3,487,437
Patented Dec. 30, 1969

3,487,437
SNOWMOBILE WITH STABILIZING MEANS
Clarence F. Meskan, 6024 1st Ave. S.,
Minneapolis, Minn. 55419
Filed June 17, 1968, Ser. No. 737,636
Int. Cl. B62m 27/02; B62d 57/02
U.S. Cl. 180—5         7 Claims

ABSTRACT OF THE DISCLOSURE

A snowmobile including a body, foot rests disposed along the sides of the body, steering means, propelling means, stabilizing means including a runner having a straight portion terminating in an upturned front end, a bracket connected to the body of the snowmobile on the side thereof, means pivotally connecting the runner to the outer end of the bracket with the outer end of the bracket being disposed outwardly of the foot rest and the point of connection of the bracket with the body being at a point rearwardly of the transverse centerline of the snowmobile. The transverse extent of the bracket is beyond the foot rest.

Summary of the invention

The invention relates broadly to snowmobiles and more particularly to an auxiliary runner attached to each side of the snowmobile body. The runner includes a straight portion which terminates in an upturned front end portion. The runner is pivotally mounted on a bracket connected to the body of the snowmobile whereby the runner is normally disposed at an angle to the horizontal with the forward end raised slightly and the rear end lowered below horizontal. In such a position the rear end of the runner does not touch the ground, but when an object is encountered by the forward portion of the runner, the runner tilts upwardly due to the angular disposition of the runner. When the snowmobile is tilted to one side or the other, the runner contacts the snow or ice and tipping of the snowmobile is reduced to a minimum. The bracket which mounts the runner is at a point rearwardly of the transverse centerline of the snowmobile whereby there is no engagement of the same by the leg or foot of an operator or passenger of the snowmobile. The bracket extends transversely outwardly of the foot rest which extends alongside of the body of the snowmobile.

These and other more detailed and specific objects will be disclosed in the course of the following specification, reference being had to the accompanying drawings, in which:

FIG. 1 is a side elevational view of a snowmobile on which is mounted an auxiliary runner embodying the invention, an operator and passenger shown in broken lines in position on the snowmobile.

FIG. 2 is a rear view of the illustration of FIG. 1.

FIG. 3 is a top plan view of the rear portion of the snowmobile of FIGS. 1 and 2.

FIG. 4 is an enlarged side elevational view of a rear portion of the illustration of FIGS. 1–3 on the line 4—4 of FIG. 2 showing in particular the auxiliary runner.

FIG. 5 is a view on the line 5—5 of FIG. 4.

FIG. 6 is a section view on the line 6—6 of FIG. 4.

Referring to the drawings in detail, the auxiliary runner A is secured to the conventional snowmobile S. The snowmobile S includes the main frame body 10 including the spaced horizontal side walls 12 and 14 secured to the bottom member 16. A transverse extension of the bottom 16 forms the foot rest 18 which extends outwardly from the wall and longitudinally thereon on one side of the main frame body. An identical foot rest 20 is formed on the side wall 14 on the opposite side of the main frame body. Operatively mounted on the underside of the main frame body 10 is the conventional longitudinally extending endless track mechanism T which drives the ground-engaging track member 22. A conventional steering front runner 24 is mounted on the front of the snowmobile, and a conventional elongated seat cushion 26 for the operator is mounted on top of the main frame body 10 with the back rest 28. Conventional steering handle bars 30 and 32 are mounted in operative connection with the front runner 24.

The snowmobile S has mounted on one side thereof the auxiliary runner A and on the opposite side the auxiliary runner B. Runners A and B and the brackets therefor are identical except as to left and right and therefore only runner A and the bracket therefor will be described. The runner A includes the right angle bracket 34 formed of the horizontal arm portion 36 and the vertical arm portion 38 connected to and extending downwardly from the outer end of the horizontal portion 36. The horizontal arm 36 is of a length to extend beyond the width of the foot rest 18. The ski or runner member 40 with the straight portion 41 and the upturned forward end 42 is formed with the spaced upstanding lugs 44 and 46. The lower end of the bracket arm 38 is formed with the hole 48 and each of the lugs 44 and 46 is formed with a hole 50. A support pivot pin 52 is positioned in and extending through the holes of lugs 44 and 46 and the arm 38 thereby pivotally mounting the runner 40 on the bracket 34. The pin is secured in position by the cotter pins 54.

The upper inner end of the horizontal arm portion 36 is connected to outer plate 56, the plate being formed with spaced holes 58 and 60. A back up plate 62 is provided which is formed with spaced holes 64 and 66. A pair of holes 68 and 70 are drilled through the side wall 12 the same distance apart as the holes in the plates 56 and 62. The bracket 34 is mounted on the wall 12 by securing nut-equipped bolts 72 and 74 through the plates and the holes in the plates.

The bracket mounting holes 68 and 70 in the wall 12 are positioned at the rear of the wall 12 at a point to the rear of the transverse centerline of the snowmobile and more specifically within the rearmost twenty-five percent of the length of the body of the snowmobile whereby the bracket together with the forward half of the runner A is not in the way of foot and leg of the operator or passenger sitting on the seat 26 with his feet on the foot rest and his back against the back rest 28. Further, the vertical disposition of the holes 68 and 70 is such that the bracket holds the runner A approximately one and five-eighths inch off the ground when the snowmobile is placed on the ground in an upright position with the track T upon the floor and the runner held horizontally.

The upstanding lugs 44 and 46 are so positioned on the top surface of the runner that the runner is slightly heavier from the pin 52 to the rear end of the runner than from the pin to the front of the runner whereby the runner pivotally hangs at an angle to the horizontal with the rear portion below the horizontal but not contacting the ground and the tip 42 titled upwardly above the horizontal as illustrated in the FIGS. 1 and 4 in particular.

With the runner A hanging in the angular position shown and described, the rear end of the same does not touch the ground and will not engage an object which it contacts but tends to go over the same due to the angular disposition. Also when the snowmobile tips to one side the rear end of the runner first makes ground contact and assumes a position flat upon the snow or ice due to the pivot construction as illustrated in broken lines in FIG. 4. In this position, the snowmobile is prevented from tipping. In upright normal and non-tilting operation of the snowmobile the runners A and B do not generally contact the snow or ice, for as described, the attitude of the runners is as illustrated in FIGS. 1 and 4.

It is understood that suitable modifications may be made in the structure as disclosed.

Having now therefore fully illustrated and described my invention, what I claim to be new and desire to protect by Letters Patent is:

1. In a snowmobile including a main frame, an endless track supporting the rear of said snowmobile and propelling the snowmobile, a front runner for steering the same, a laterally extending flange providing a foot rest disposed on each side of the body, the combination of:
   (a) a runner having a straight portion terminating in an upturned front end,
   (b) a bracket,
   (c) means connecting said bracket to the body of the snowmobile on the side thereof,
   (d) means pivotally connecting said runner to the outer end of said bracket,
   (e) said bracket extending outwardly of the foot rest on said body,
   (f) the point of connection of said bracket with said body being at a point to position the transverse centerline of said runner at a point within the rearmost twenty-five percent of the longitudinal extent of the endless track.

2. The device of claim 1 in which said point of pivotal connection of said bracket with said runner is forward of the transverse centerline of the runner thereby disposing said runner at an angle to the horizontal.

3. The device of claim 1 in which said pivotal connection of said runner with said bracket includes lug means secured to the runner with the bracket pivotally connected to the lug means.

4. The device of claim 1 in which
   (a) said bracket includes a horizontal portion terminating in a
   (b) depending vertical portion.

5. The device of claim 4 in which
   (a) said means for connecting said bracket includes a plate on the inner end of said horizontal portion and
   (b) means for connecting said plate to the side of the snowmobile.

6. The device of claim 5 in which said point of pivotal connection of said bracket with said runner is forward of the transverse centerline of the runner thereby disposing said runner at an angle to the horizontal.

7. The device of claim 6 in which said pivotal connection includes lug means secured to the runner with the lower end of said vertical portion of said bracket pivotally connected to the lug means.

References Cited

UNITED STATES PATENTS

| | | | |
|---|---|---|---|
| 1,055,609 | 3/1913 | Chesney | 180—5 |
| 2,846,017 | 8/1958 | Luchterhand | 180—5 |
| 2,914,126 | 11/1959 | Skullerud | 180—5 |
| 2,925,873 | 2/1960 | Laporte | 180—5 |

RICHARD J. JOHNSON, Primary Examiner

U.S. Cl. X.R.

280—8